United States Patent [19]

Hewitt et al.

[11] Patent Number: 4,808,958
[45] Date of Patent: Feb. 28, 1989

[54] LINEAR VARIABLE DIFFERENTIAL TRANSFORMER WITH IMPROVED SECONDARY WINDINGS

[75] Inventors: Richard P. Hewitt, Hemet; Timothy A. Shoemaker, Romoland; Paul F. Kitlas, Dana Point, all of Calif.

[73] Assignee: Bourns Instruments, Inc., Riverside, Calif.

[21] Appl. No.: 92,829

[22] Filed: Sep. 3, 1987

Related U.S. Application Data

[63] Continuation-in-part of Ser. No. 77,138, Jul. 23, 1987.

[51] Int. Cl.$^4$ .............................................. H01F 21/06
[52] U.S. Cl. ...................................... 336/136; 336/224
[58] Field of Search ............... 336/136, 130, 186, 187, 336/188, 189, 224, 206

[56] References Cited

U.S. PATENT DOCUMENTS

| | | | |
|---|---|---|---|
| 2,461,238 | 2/1949 | Schaevitz | 336/136 |
| 2,621,324 | 12/1952 | Wen Yuan Pan | 336/224 X |
| 3,017,589 | 1/1986 | Chass | 336/136 |
| 3,054,976 | 9/1962 | Lipshutz | 336/136 |
| 3,113,280 | 12/1963 | Hobley | 336/136 X |
| 4,166,264 | 8/1979 | Starr | 336/181 X |

Primary Examiner—Thomas J. Kozma
Attorney, Agent, or Firm—Howard J. Klein; William G. Becker

[57] ABSTRACT

A linear variable differential transformer (LVDT), includes a hollow bobbin with first and second ends, a ferromagnetic core adapted for linear movement within the bobbin, a primary coil wound around the exterior of the bobbin, and first and second secondary coils wound around the primary coil. The first and second secondary coils are wound from starting points at the first and second bobbin ends, respectively. The seconardy coils are then wound continuously and simultaneously toward the opposite bobbin ends, so that the two secondary coils cross over each other at a cross-over point approximately halfway between the bobbin ends. The second secondary coil thus overlaps the first secondary coil between the cross-over point and the first bobbin end, and the first secondary coil overlaps the second secondary coil between the cross-over point and the second bobbin end. Each of the secondary coils has a sufficient continuous length to overlay substantially the entire length of the primary coil. The average distance of the first secondary coil from the primary coil is approximately equal to the average distance between the second secondary coil and the primary coil, thereby equalizing the flux densities in the two secondaries. The result is a substantially equal transfer function between the primary coil and each secondary coil, with well-balanced output characteristics.

13 Claims, 4 Drawing Sheets

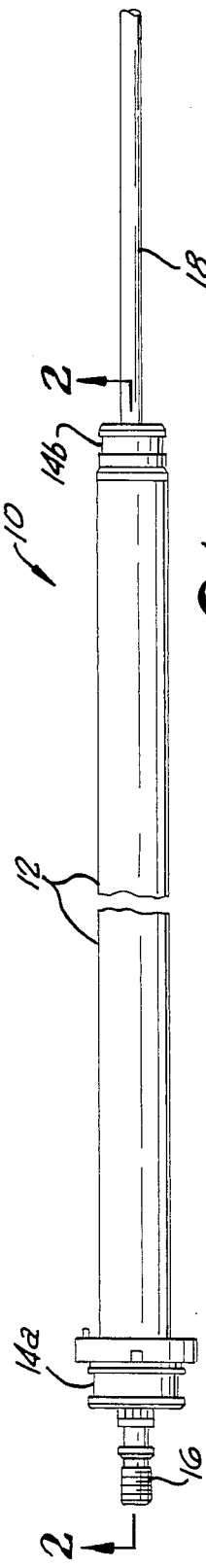
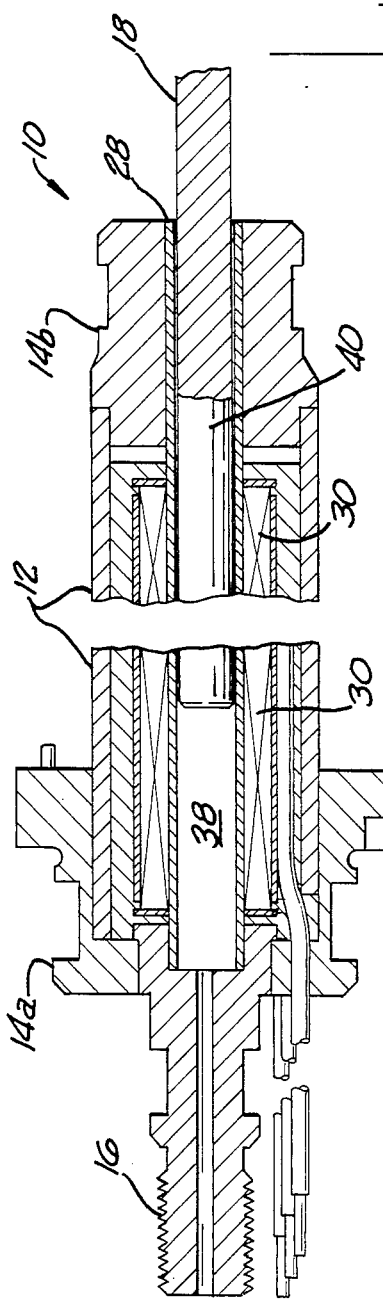
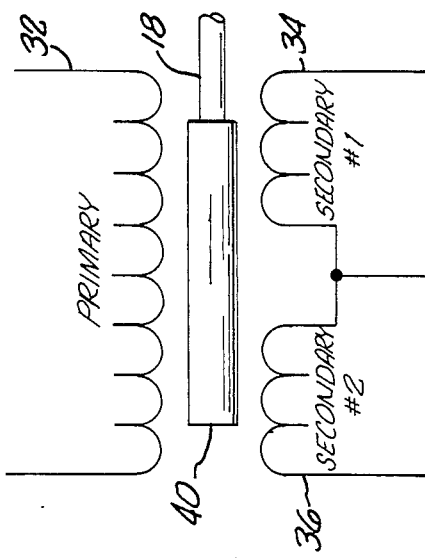

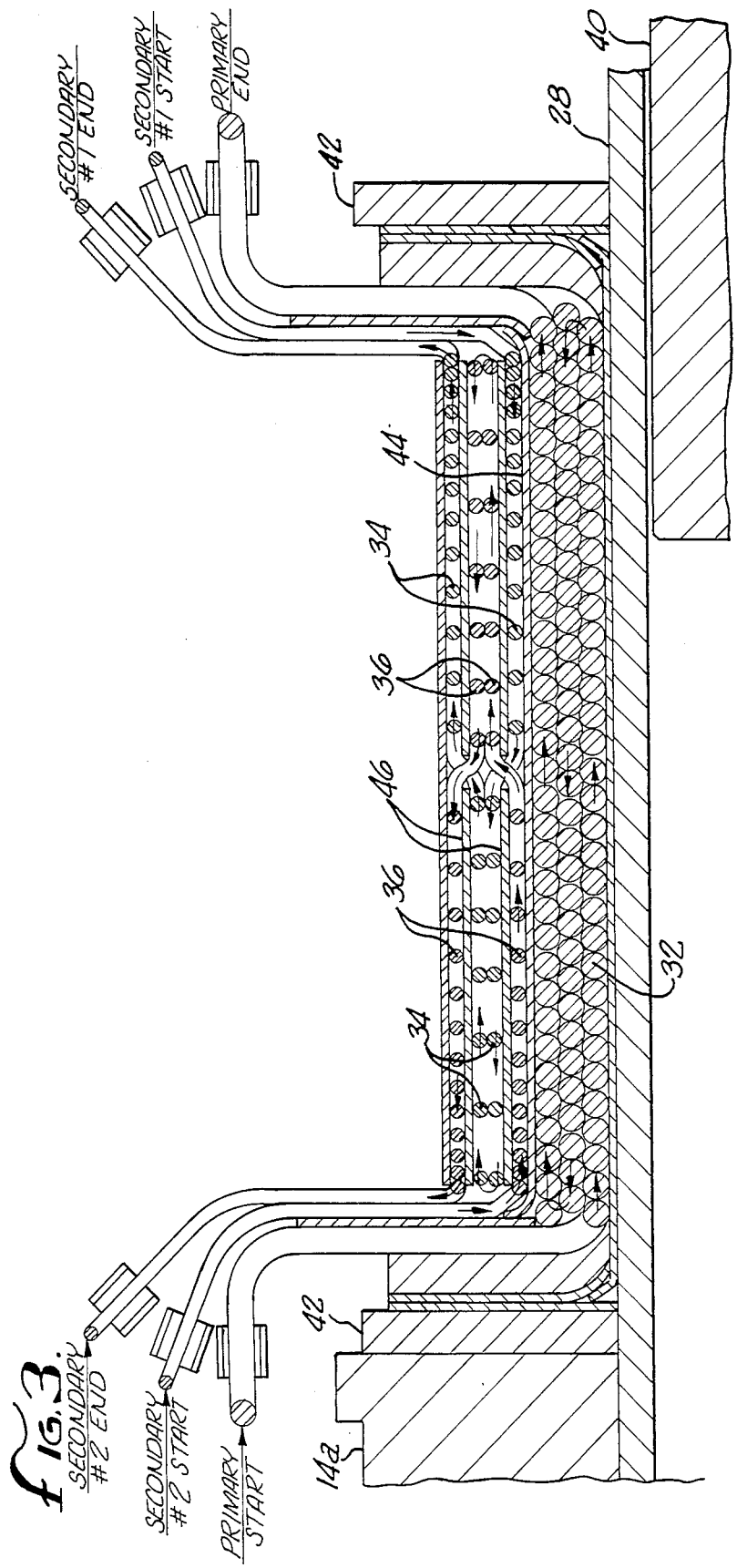

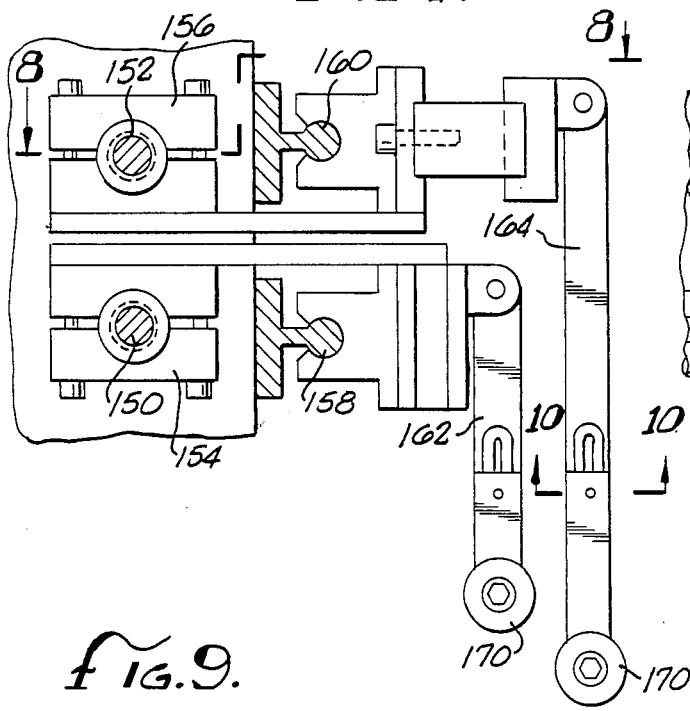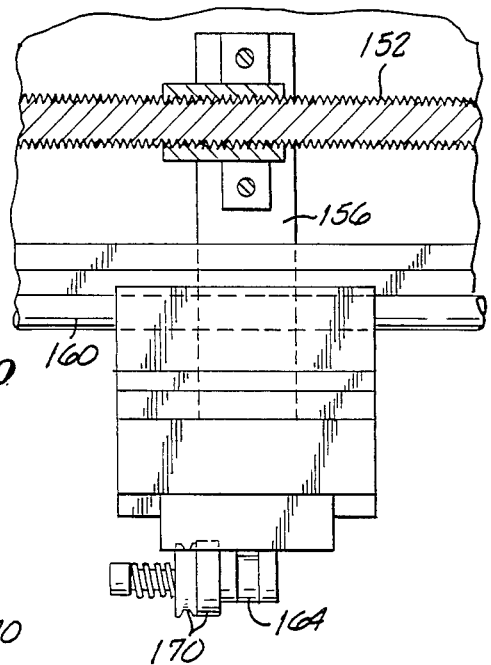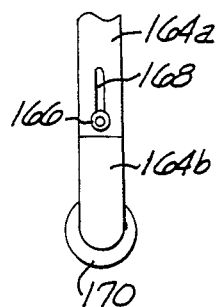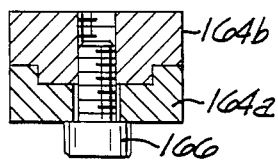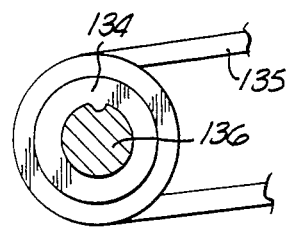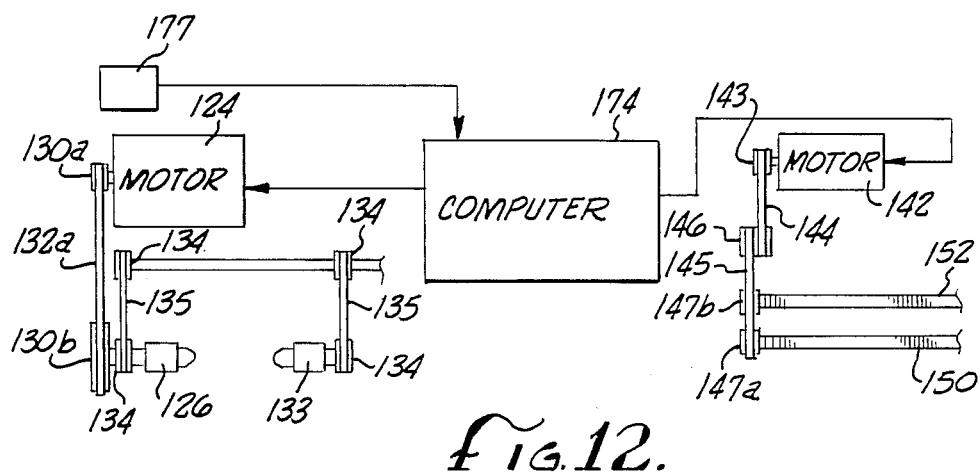

LINEAR VARIABLE DIFFERENTIAL TRANSFORMER WITH IMPROVED SECONDARY WINDINGS

CROSS REFERENCE TO RELATED APPLICATION

This application is a Continuation-In-Part of Application Ser. No. 07/077,138; Filed July 23, 1987; Richard P. Hewitt, Inventor.

BACKGROUND OF THE INVENTION

The present invention relates to the field of linear variable differential transformers or "LVDTs". More specifically, it relates to an improvement in the configuration of the secondary coils in LVDTs, and to the novel process by which the improved secondary coils are made.

As is well known, LVDTs are, basically, position sensors. They operate on the principle that a ferromagnetic core is moved through the interior of a hollow bobbin onto which a single primary coil and at least two secondary coils of wire are wound. The magnitude of the magnetic coupling of the coils to one another depends on the position of the movable core. Voltage and phase shift measurements, which may be obtained by comparing the outputs of the two secondary coils with the input to the primary coil, are indicative of the position of the movable core.

A troublesome problem with prior art LVDTs has been the achievement of good output linearity. Improved results in this respect have been provided by varying the pitch of the secondary coils along the length of the bobbin. In such an arrangement, a first secondary coil is wound over the primary coil with its pitch increasing in one direction, and a second secondary coil is wound over the first secondary coil, with its pitch increasing in the opposite direction. The three coils are thus arranged concentrically, with the primary coil innermost, the first secondary coil in the middle, and the second secondary coil outermost.

The above-described "concentric secondary" arrangement has some disadvantages, however, as a result of the two secondary coils not being equidistant from the primary coil. For example, there are inherent imbalances between the two secondaries in DC resistance, secondary impedance, and output voltage, all resulting from unequal inductive coupling between the primary coil and each of the two secondary coils. These imbalances can be corrected, to some extent, by careful adjustment of the pitch variations in the two secondary coils, but such adjustment complicates the manufacturing process. In addition, the concentric secondary arrangement results in a small, but measurable, intercoil capacitance which can adversely affect the accuracy of the measurements obtained with the LVDT.

One approach to solving the above-mentioned problems is suggested in U.S. Pat. No. 3,017,589 to Chass. The Chass patent shows an LVDT having a primary coil, a first secondary coil assembly and a second secondary coil assembly. Each of the secondary coil assemblies comprises a plurality of discrete secondary coil units. The coil units of the first secondary coil assembly are wound over the coil units of the second secondary coil assembly along one half of the length of the bobbin, and the coil units of the second secondary coil assembly are wound over the coil units of the first secondary coil assembly along the other half of the bobbin. This arrangement equalizes the average distance between each secondary coil assembly and the primary coil, thereby minimizing imbalances between the two secondary coils. In addition, the symmetrical arrangement of the two secondaries minimizes the deleterious effects of intercoil capacitance.

One important shortcoming of the device described in the Chass '589 patent is its requirement of a plurality of discrete secondary coil units, each of which must be separately wound and terminated. This arrangement thus increases the complexity and cost of manufacture. In addition, the need for electrical connections among all of the secondary coil units can result in reduced durability and reliability for the LVDT.

Thus, the need has been felt to provide the advantages of the Chass '589 device without the disadvantages of a multiplicity of discrete secondary coil units. Such a need could be fulfilled by an LVDT which employs two continuous, unitary secondary coils, each occupying a major portion of the bobbin's length, but crossing over one another near the midpoint of the bobbin. Until the advent of the present invention, however, there were no practical means available for winding a linearized and balanced pair of secondary coils in this manner.

SUMMARY OF THE INVENTION

Broadly, the present invention is an LVDT with a novel secondary coil structure, characterized in that first and second continuous unitary secondary coils are each wound around the major portion of the length of bobbin, the two secondary coils crossing over one another between their respective starting points near the opposite ends of the bobbin. More specifically, each of the secondary coils is wound onto a bobbin onto which has previously been wound the primary coil of the LVDT. The first secondary coil is started near a first bobbin end and is wound toward the opposite (second) bobbin end, the pitch being increased as the coil is wound toward the second bobbin end. The second secondary coil is started near the second bobbin end and is wound, with increasing pitch, toward the first bobbin end. At a cross-over point between the bobbin ends (preferably at or near the midpoint of the bobbin), the two secondary coils cross over each other. The result is that between the cross-over point and the first end of the bobbin, the second secondary coil overlaps the first secondary coil, while between the cross-over point and the second bobbin end, the radial positions of the two secondary coils are reversed.

In the preferred embodiment of the invention, the two secondary coils cross over each other a plurality of times to form an interleaving of first and second secondary coil layers on each half of the bobbin, the order of layers near the first bobbin end being the opposite of the order of layers near the second bobbin end. With this configuration, each of the secondary coils has a plurality of layers that are equidistant from the primary coil with complementary layers (on the other half of the bobbin) of the other secondary coil.

Another aspect of the novelty of the present invention is that it constitutes an LVDT made by a novel manufacturing process. Briefly, this process comprises the steps of: (1) providing a bobbin having a primary coil wound along a substantial portion of its length; (2) rotating the bobbin about its longitudinal axis; (3) winding a first wire onto the rotating bobbin while moving the first wire linearly in a reciprocating motion parallel to the longitudinal axis of the bobbin, thereby winding a first secondary coil around the primary coil; and (4) simultaneously winding a second wire onto the rotating bobbin while moving the second wire linearly in a reciprocating motion parallel to the longitudinal axis of the bobbin, thereby winding a second secondary coil around the primary coil, the linear motion of the second wire always being 180 degrees out of phase with the linear motion of the first wire, so that the first and second wires cross one another substantially at the midpoint along the length of the bobbin. In the preferred embodiment of the invention, the linear movements of the two wires are varied in speed along the length of the bobbin to provide the pitch variations described above.

The novel LVDT in accordance with the present invention is made with an apparatus that performs the above-described process. The apparatus includes motorized means for rotating the bobbin along its longitudinal axis, and a pair of wire guides which guide the two separate strands of wire onto the bobbin, as the latter is rotated, in a manner which forms the two secondary coils.

More specifically, the apparatus includes a first wire guide which is moved in a reciprocating linear motion along the bobbin, parallel to the axis of rotation of the bobbin, whereby a first strand of wire is wound on the bobbin. A second wire guide is also moved linearly in a reciprocating motion along the bobbin, parallel to the rotational axis of the bobbin, whereby a second strand of wire is also wound on the bobbin. The motions of the first and second wire guides are coordinated so that the two are always moving in directions opposite to one another, whereby the two strands of wire cross one another substantially at the center of the bobbin.

As will be more fully appreciated from the detailed description which follows, the present invention provides an LVDT with an output that is highly linear and well-balanced. As in the Chass '589 device, the secondary impedances and DC coil resistances are substantially equalized, and the intercoil capacitance effects are minimized. The disadvantages of the multiple secondary coil units employed in the Chass '589 device are, however, avoided, resulting in an LVDT that is less costly to manufacture, and which provides improved durability and reliability.

BRIEF DESCRIPTION OF THE DRAWINGS

FIG. 1 is an elevational view of a linear variable differential transformer (LVDT) of the type which employs a secondary coil construction in accordance with the present invention;

FIG. 2 is a cross-sectional view along line 2—2 of FIG. 1;

FIG. 3 is a detailed, longitudinal cross-sectional view of a portion of the LVDT of FIGS. 1 and 2, showing the novel secondary coil construction of the present invention;

FIG. 4 is a schematic representation of the LVDT of FIGS. 1 and 2.

FIG. 7 is a cross-sectional view taken along line 7—7 of FIG. 5;

FIG. 8 is a cross-sectional view taken along line 8—8 of FIG. 7;

FIG. 9 is a partial rear elevational view of one wire guide arm shown in FIG., 7;

FIG. 10 is a cross-sectional view taken along line 10—10 of FIG. 7;

FIG. 11 is a cross-sectional view taken along line 11—11 of FIG. 5; and

FIG. 12 is a partly schematic representation of the apparatus of FIGS. 5 through 11.

Figure 5:
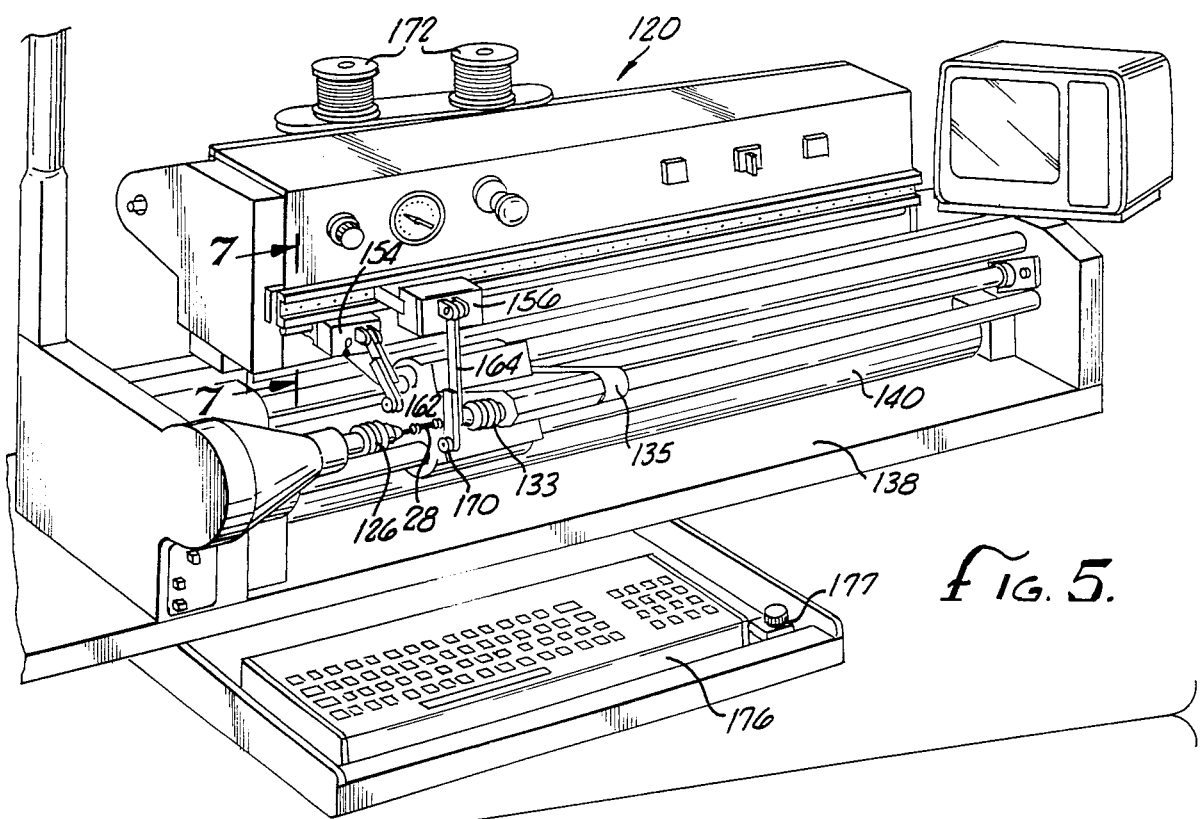
FIG. 5 is a perspective view of the apparatus used to construct the secondary coils of the LVDT, as shown in FIG. 3, in accordance with the method of the present invention.

DETAILED DESCRIPTION OF THE INVENTION a. The LVDT of FIGS. 1 through 4

FIGS. 1, 2, 3, and 4 illustrate a linear variable differential transformer (LVDT) 10, of the type which advantageously employs the second coil construction of the present invention. The secondary coil construction of the present invention, to be described below, can, in fact, be employed in a wide variety of LVDTs. Thus, the LVDT 10 is shown by way of example only, and it is described for the purpose of establishing the context of the present invention. Because LVDTS are well-known in the art, and because the LVDT 10 differs from prior art LVDTs only in the secondary coil design, the description of the other major components of the LVDT 10 will be brief.

As shown in FIGS. 1, 2, and 3, the LVDT 10 includes a tubular housing 12 of a magnetic material, with end caps 14a and 14b at opposite ends thereof. One end cap, the end cap 14a, for example, may be provided with a threaded fitting 16 for attachment to the structural support element (not shown). The other end cap 14b is centrally apertured for slideably receiving a shaft 18.

As shown in FIGS. 2 and 3, the hollow interior of the housing 12 contains a hollow, cylindrical or tubular bobbin 28, around which is wound a wire coil assembly 30. The coil assembly 30 includes a primary coil 32, a first secondary coil 34, and a second secondary coil 36, all of which are shown schematically in FIG. 4. These coils are described in detail below.

The interior of the bobbin 28 forms a passage 38 that slideably receives the proximal end of the shaft 18. Attached to the proximal shaft end is a cylindrical core 40 of ferromagnetic material The core 40 is thus able to move linearly within the passage 38 as the shaft 18 is moved linearly in response to the motion of, for example, an airfoil control surface or the like (not shown) connected to its distal end.

The bobbin 28 itself is formed of a non-magnetic metal. As shown most clearly in FIG. 4, it has first and second ends, to each of which is attached a shield washer 42 of ferromagnetic metal The shield washers 42 and the housing 12 thus confine the magnetic field produced by the flow of current through the primary coil 32.

The manner of operation of an LVDT is well-known, and need only be described briefly for present purposes. Referring to FIG. 4, an AC signal is applied to the primary coil 32. The first secondary coil 34 and the second secondary coil 36, which are symmetrically spaced from the primary coil, are connected externally in a series-opposing circuit. The motion of the core 40 varies the mutual inductance of each secondary coil to the primary coil, thereby varying the voltages induced in the secondaries. The relative position of the core 40 to the two secondaries thus produces a differential voltage across the secondary coil outputs. This differential voltage ideally has a linear relationship to the linear displacement of the core 40, and thus of the shaft 18.

Referring now to FIG. 3, the novel coil structure of the present invention is most clearly shown. It should be pointed out that FIG. 4 is a somewhat idealized rendering of an exemplary LVDT constructed in accordance with the present invention, and, in practice, the wide variety of LVDT designs which can incorporate the present invention will dictate some modifications of the illustrated structure that are not material to the essence of the present invention.

As previously mentioned, the LVDT 10 has a primary coil 32 wound around the bobbin 28. The primary coil 32 consists of a multi-layer winding of insulated wire, wound between the first and second bobbin ends. After the primary coil 32 has been wound, it is covered with a first layer 44 of insulating tape. Wound over the first tape layer 44 are the first and second secondary coils 34 and 36, respectively. The secondary coils are wound by the novel process that is described below. Structurally, they can be described as follows:

The first secondary coil 34, formed of an insulated wire, starts at a first end of the bobbin 28. In FIG. 3, the first end is shown on the right, adjacent to one of the shield washers 42. The first secondary coil 34 is wound, with gradually increasing pitch (actually, increasing in discrete increments) from right to left on the bobbin 28 toward the approximate mid-point of the bobbin. Simultaneously with the winding of the first secondary coil, the second secondary coil 36 is wound, starting from the second (left) end of the bobbin 28, and progressing rightwardly toward the mid-point of the bobbin, again with incrementally increasing pitch. The mid-point of the bobbin forms a cross-over point, at which the first and second secondary coils cross over one another. Thus the first secondary coil 34 overlaps the second secondary coil 36 on the left half of the bobbin (i.e., between the cross-over point and the left end), and the second secondary coil 36 overlaps the first secondary coil 34 on the right half of the bobbin (i.e., between the cross-over point and the right end).

A significant feature of the present invention is that each of the secondary coils is wound continuously from its starting point at one end of the bobbin, all the way past the cross-over point to the opposite bobbin end, thereby overlaying substantially the entire length of the primary coil 34.

In the preferred embodiment shown in FIG. 3, the first and second secondary coils cross over each other a plurality of times. These multiple cross-overs occur at or near the axial position along the bobbin's longitudinal axis of the first cross-over point. In FIG. 3, there are thus shown two cross-over points aligned along substantially the same radius at substantially the same axial position. These two cross-over points could, however, be on different radii.

In the preferred embodiment of FIG. 3, the two secondary coils, crossing over each other twice, form an interleaving of the two secondary coils between each bobbin end and the bobbin's mid-point. On the right half of the bobbin, the interleaving comprises a first, radially innermost layer comprising a single thickness of the first secondary coil; a second layer, radially outward from the first layer, comprising a double thickness of the second secondary coil; and a third layer, radially outward from the second layer, comprising a single thickness of the first secondary coil. On the left half of the bobbin, the interleaving forms alternating layers of the first and second secondary coils which are complementary to the layers on the right half: a fourth, radially innermost layer of a single thickness of the second secondary coil; a fifth layer, radially outward from the fourth layer, comprising a double thickness of the first secondary coil; and a sixth layer, radially outward from the fifth layer, comprising a single thickness of the second secondary coil. With this interleaved construction, each secondary coil has a layer equidistant from the primary coil with a layer of the other secondary coil. Thus, the first layer (first secondary coil) and the fourth layer (second secondary coil) are substantially equidistant from the primary coil. Likewise, the complementary second and fifth layers are equidistant from the primary coil, as are the complementary third and sixth layers. The average distance of the first secondary coil from the primary coil is therefore approximately equal to the average distance from the second secondary coil to the primary coil.

Of course, the two secondary coils can be crossed over each other more than twice to create as many interleaved complementary secondary coil layers as desired. Regardless of the number of layers, adjacent layers are advantageously separated by insulating coverings 46, preferably formed of strips of insulating tape.

The secondary coil construction described above, having a near-perfect geometric symmetry with respect to the primary coil, yields highly-balanced electrical characteristics. Specifically, secondary coil impedance and DC resistances are substantially equalized due to an equalization in the flux densities in the two secondaries, as a result of their equalized average distances from the primary coil. Accordingly, a more nearly equal transfer function is provided between the primary coil and each of the secondary coils. In addition, the effects of intercoil capacitance are minimized. A further advantage is that the use of continuous secondary coils allows good output linearity to be achieved (using graduated coil pitches) with a relatively large stroke-to-coil length ratio, thereby allowing the LVDT to be reduced in overall length. Finally, the number of coils is kept to a minimum, thereby eliminating the need for a multiplicity of intercoil connections, and thus improving the reliability and durability of the LVDT.

b. The Apparatus and Method of Manufacture

The present invention has further novelty in the process or method of its manufacture. To understand that process, a description of the novel apparatus used to make an LVDT in accordance with the present invention is needed. A description of the apparatus follows, reference being made to FIGS. 5 through 12 of the drawings.

Figure 6:
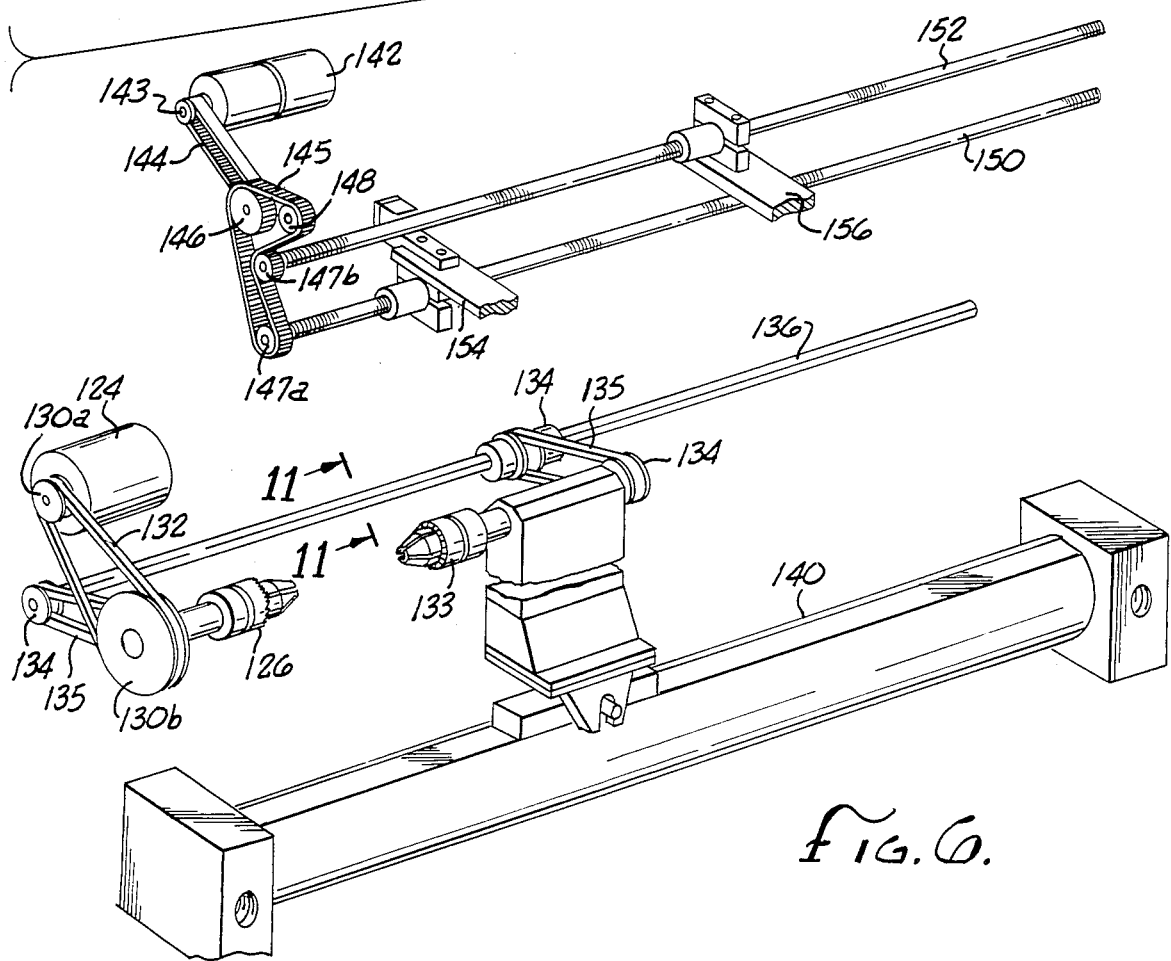
FIG. 6 is an exploded perspective view of the major components of the apparatus of FIG. 5.

The coils 32, 34, and 36 of the LVDT of FIGS. 1 through 4 are wound on a novel coil-winding apparatus or machine 120, shown in FIGS. 5 through 12. As best shown in FIGS. 5, 6, and 12, the coil winding apparatus 120 includes a first electric motor 124 which rotates a chuck 126 adapted to hold the bobbin 28. The first motor 124 rotates the chuck 126 through a pair of drive pulleys 130a and 130b linked by a main drive belt 132. The first motor 124 also actively drives a rotating tailstock 133 which is also adapted to hold the bobbin 28. The tailstock 133 is driven by the first motor 124 through an arrangement of pulleys 134 and belts 135, linked by a slotted shaft 136, the latter being shown in cross-section in FIG. 11. As is common practice in the art of constructing coil winding machines, the tailstock 133 is slideably mounted relative to the chassis 138 of the apparatus 120. In this connection, it is noted that the preferred embodiment 120 of the coil winding machine of the present invention may be constructed from component parts and elements generally known in the art. Specifically, the preferred embodiment 120 may be constructed by modifying commercially available state-of-the-art coil winding machines, such as, for example, the BACHI model No. 215 coil winder, which is well-known to those skilled in the art. In fact, the apparatus shown in FIG. 5 of the drawings is a modification, in accordance with the novel principles of the present invention, of the BACHI Model No. 215 coil winder.

It was found advantageous within the practice of the present invention to exert a moderate force on the slideably mounted tailstock 133 in a direction pulling it away from the chuck 126 so as to cause the bobbin 28 to be under moderate tension while wire is being wound thereon. This is accomplished in the apparatus of the present invention by including, in the chassis 138, a state-of-the-art rodless air cylinder 140, such as the commercially available ORIGA Series P120 cylinder. The air cylinder 140, the construction of which, per se, does not form any part of the present invention, is best shown in FIG. 6.

Referring still primarily to FIGS. 5, 6 and 12, wire guides, carriages for wire guides, and a mechanism for actuating the wire guides in accordance with the principles of the present invention, are disclosed.

More particularly, the apparatus 120 of the present invention includes a second electric motor 142, having an output shaft 143 which drives, through a drive belt 144, a lead screw rotating mechanism comprising an appropriately positioned timing belt 145, a drive pulley 146, a pair of counter-rotating pulleys 147a and 147b, and an idler pulley 148. The first counter-rotating pulley 147a is connected to a first lead screw 150, and the second counter-rotating pulley 147b is connected to a second lead screw 152. The positioning and dimensions of the timing belt 145, the drive pulley 146, the counter-rotating pulleys 147a and 147b, and the idler pulley 148 are such that the first and second lead screws 150 and 152 rotate at identical speeds by always in directions opposite to one another. The lead screws 150 and 152, and also the second electric motor 142, are mounted to the chassis 138 of the apparatus 120.

The first lead screw 150 drives, or, more accurately stated, causes to move, a first wire guide carriage 154 linearly along a longitudinal axis which is parallel with the axis of rotation of the bobbin 28. The second lead screw 152 is mounted to rotate in an axis parallel with the axis of rotation of the first lead screw 150. The second lead screw 152 causes a second wire guide carriage 156 to move linearly, parallel with the first wire guide carriage 154. Mounting of the wire guide carriages 154 and 156 on the respective lead screws 150 and 152 is also shown in the cross-sectional views of FIGS. 7 and 8. FIGS. 7 and 8 also show that two fixedly mounted rails 158 and 160 are included in the apparatus 120 of the present invention. The first and second wire guide carriages 154 and 156 are slideably mounted on these first and second rails 158 and 160, respectively. In this regard it is noted that the construction of the wire guide carriages and their mounting on lead screws and raids, per se, may be accomplished in accordance with the state-of-the-art. However, the mounting and operation of two lead screws and two wire guide carriages in the herein-described manner is considered novel and innovative.

Referring now primarily to FIGS. 5 and 7 to 10, each wire arm carriage carries a wire guide arm of adjustable length. The wire guide arms carried by the first and second carriages 154 and 156, respectively, bear the reference numerals 162 and 164. FIGS. 9 and 10 illustrate the assembly of the wire guide arm 164 in detail. The assembly has two parts 164a and 164b secured to one another by a bolt 166 fitted in an elongated slot 168. This construction permits adjustment of the length of the wire guide arms.

The wire guide arms 162 and 164 each terminate in a wire guide finger which has a pair of spring-biased discs 170. The discs 170 hold, under a light spring force, a thin strand of wire which is to be wound on the bobbin 28. It will be readily understood by those skilled in the art that the wire can readily move between the discs 170. As the wire is wound onto the bobbin 28, it is gradually unraveled from one of a pair of spools 172 which are conveniently placed on the top of the apparatus 120. Each of the spools 172 feeds its wire to one of the wire guide arms 162 and 164.

It is an important novel feature of the present invention that the two wire guide arms 162 and 164 always move in directions opposite to one another. In the preferred embodiment, this is accomplished through the respective lead screws 150 and 152 which always rotate in opposite directions to one another, and accordingly carry the respective wire guide carriages 154 and 156 in opposite directions. The lead screws 150 and 152, the wire guide carriages 154 and 156, and the wire guide arms 162 and 164 are spaced in such a manner that both wire guide arms 162 and 164 can simultaneously move in reciprocating linear motions, in directions opposite to one another and still parallel with the rotating bobbin 28. The two wire guide arms 162 and 164 arrive substantially simultaneously at the longitudinal center of the bobbin 28. Thus, during each full length of travel of a wire guide arm along the bobbin 28, the wire wound by that arm to the bobbin 28 crosses the wire wound by the other arm.

The diagrammatic and schematic view of FIG. 12 shows a computer 174 which controls the speed of rotation of the bobbin 28 and the speed of the linear motions of the two wire guide carriages 154 and 156. In other words, the computer 174 controls the pitch of the windings which are deposited on the bobbin 28. In this connection it is noted that controlling the pitch of the windings in accordance with a computer program, per se, is not novel. The above-noted state-of-the-art BACHI Model No. 215 coil winding apparatus, for example, may also be controlled by a computer program. In light of the foregoing, the role and operation of the computer 174 is described here only to the extent necessary to explain the present invention.

Briefly summarized then, the computer 174 itself is controlled by a program which may be actuated and changed by appropriate input at the keyboard 176. The program contains information regarding the winding to be performed, for example, the desired speed of rotation of the first motor 124 and of the bobbin 28, the length of linear travel of the wire guide carriages 154 and 156, and the starting positions of such travel. In accordance with the state-of-the-art, the apparatus 120 also includes encoders (not shown) which act as sensors and detect the positions of the wire guide carriages 154 and 156 and the speeds of rotation of the first and second electric motors 124 and 142. The encoders (not shown) input this information into the computer 174. The program used in connection with the apparatus and process of the present invention is designed to vary the speed of the wire guide carriages 154 and 156 in accordance with a predetermined pattern which is required for the particular coil to be wound on the apparatus. In other words, the computer program permits variations in the pitch of the windings in accordance with a predetermined program. A pattern having a pitch which gradually changes along the length of the bobbin 28 is described above and shown on FIG. 3.

A potentiometer 177 is incorporated in the apparatus of the present invention to permit direct manual control of the first electric motor 124 The encoders (not shown) input the speed of the first motor 124 into the computer 174. In accordance with the programs used in accordance with the preferred embodiment of the invention, the computer 174 changes the speed of the second motor 142 whenever the speed of the first motor 124 is changed. This is done in order to maintain a programmed ratio of the respective speeds of the rotations of the two motors 124 and 142. Accordingly, in the herein-described preferred embodiment of the apparatus 120 of the invention, the winding process can be manually slowed down, or temporarily halted, without affecting the computer program. The program itself, just like the basic BACHI Model No. 215 coil winding apparatus, is available commercially.

The LVDT of FIGS. 1 through 4 is made on the apparatus 120 by a novel method or process. First, a bobbin 28 having the primary coil 32 wound around a substantial portion of its length, is provided. The primary coil 32 can be wound using either the apparatus 120 or a conventional coil winding machine. The bobbin 28 is held in the chuck 126 and the tailstock 133, and is rotated about its longitudinal axis. The secondary coils are applied by feeding a first wire and a second wire through the first wire guide 162 and the second wire guide 164, respectively. The two wire guides start winding at opposite ends of the bobbin, and they are simultaneously moved linearly, as described above, in opposite directions toward the center of the bobbin as the bobbin is rotated. When the two wire guide arms 162 and 164 simultaneously reach the center of the bobbin 28, the two wires cross one another. At this point, it is advantageous, although not always necessary in accordance with the present invention, to interrupt the winding process and place a layer of the tape 46 on the top of each wire layer which has been deposited. Thereafter, the winding is continued so that each wire guide arm travels to the end of the bobbin 28 and still later moves back in the reverse direction. At the point the wire guide arms are aligned with the center of the bobbin 28, the two wires cross one another again, and another layer of the insulating tape 46 is again deposited. In this manner the winding is continued for as long as necessary to place the required number of turns on the bobbin 28.

The pitch of the windings is varied in accordance with a computer program to obtain a predetermined pitch pattern. In the LVDT shown in FIG. 3, this pattern requires the first secondary coil 34 to have a pitch which gradually increases (the spacing of the windings increases) from the right end of the bobbin 28 to the left end. The second secondary coil 36 has the opposite pitch pattern; its pitch gradually increases from left to right. In other LVDTs different pitch patterns may be incorporated. What is important in accordance with the present invention is that the wires cross over substantially in the center of the overall winding which is to be obtained.

Several modifications of the present invention may become readily apparent to those skilled in the art in light of the foregoing disclosure. In accordance with one apparent modification, the two lead screws may be driven by two different motors, although the motors are still controlled by a computer, and the two lead screws still cause the two wire arms to move in opposite directions whereby the two wires cross one another substantially in the center of the overall winding to be obtained.

The scope of the present invention should be interpreted solely from the following claims as such claims are read in light of the disclosure.

What is claimed is:

1. A linear variable differential transformer (LVDT), of the type including a hollow, tubular bobbin with first and second ends, a ferromagnetic core adapted for linear motion within said bobbin, a primary coil of wire wound around the exterior of said bobbin along a substantial portion of the length thereof, and first and secondary coils of wire wound around said primary coil, wherein the improvement comprises:
   said first secondary coil having a first starting point near said first end of said bobbin, said first secondary coil having sufficient continuous length to overlay substantially the entire length of said primary coil;
   said secondary coil having a second starting point near said second end of said bobbin, said secondary coil having sufficient continuous length to overlay substantially the entire length of said primary coil; and
   wherein said first and second secondary coils cross over each other at a cross-over point between said first and second bobbin ends, so that said first secondary coil overlaps said second secondary coil between said cross-over point and said second bobbin end, and said secondary coil overlaps said first bobbin end, said overlapping first and second secondary coils crossing over each other substantially at the axial position of said cross-over point a plurality of times, thereby forming an interleaving of said first and second secondary coils near each of said first and second bobbin ends.

2. The LVDT of claim 1, wherein said cross-over point is approximately halfway between said first and second starting points.

3. The LVDT of claim 1, wherein the pitch of said first secondary coil increases in the direction from said first starting point to said second bobbin end, and wherein the pitch of said second secondary coil increases in the direction from second starting point to said first bobbin end.

4. The LVDT of claim 1, wherein said interleaving near said first bobbin end comprises:
   a first, radially innermost layer comprising a single thickness of said first secondary coil;
   a second layer, radially outward from said first layer, comprising a double thickness of said second secondary coil; and
   a third layer, radially outward from said second layer, comprising a single thickness of said first secondary coil, and
   wherein said interleaving near said second bobbin en comprises;
   a fourth, radially innermost layer comprising a single thickness of said second secondary coil;

a fifth layer, radially outward from said fourth layer, comprising a double thickness of said first secondary coil; and a sixth layer, radially outward from said fifth layer, comprising a single thickness of said second secondary coil.

5. The LVDT of claim 4, wherein said first and fourth layers are substantially equidistant from said primary coil, said second and fifth layers are substantially equidistant from said primary coil and said third and sixth layers are substantially equidistant from said primary coil.

6. The LVDT of claim 5, further comprising an insulation covering interposed between each equidistant pair of layers.

7. The LVDT of claim 6, wherein the insulation covering includes a strip of insulating tape.

8. A linear variable differential transformer (LVDT), of the type including a hollow, tubular bobbin with first and second ends, a ferromagnetic core adapted for linear motion within the interior of said bobbin, a primary coil of wire wound around the exterior of said bobbin, along a substantial portion of the length thereof, and first and second secondary coils of wire wound around said primary coil, said first secondary coil having a first starting point near said first bobbin end and increasing in pitch in the direction from said first bobbin end to said second bobbin end, said second secondary coil having a second starting point near said second bobbin end and increasing in pitch in the direction from said second bobbin end to said first bobbin end, wherein the improvement comprises:

a first cross-over point approximately halfway between said first and second starting points along the length of said bobbin, at which said first and second secondary coils cross over each other so as to overlap said first secondary coil around said second secondary coil between said cross-over point and said second starting point, and so as to overlap said second secondary coil around said first secondary coil between said cross-over point and said first starting point; and a second cross-over point approximately halfway between said first and second starting points, at which said first and second secondary coils cross over each other so as to overlap said first secondary coil around said second secondary coil between said cross-over point and said first starting point, and so as to overlap said second secondary coil around said first secondary coil between said cross-over point and said second starting point;

wherein each of said first and second secondary coils is continuous between said first and second starting points.

9. The LVDT of claim 8, wherein said overlapping first and second secondary coils form an interleaving of said first and second secondary coils near each of said first and second bobbin ends.

10. The LVDT of claim 9, wherein said interleaving near said first bobbin end comprises:

a first, radially innermost layer comprising a single thickness of said first secondary coil;

a second layer, radially outward from said first layer, comprising a double thickness of said second secondary coil; and a third layer, radially outward from said second layer, comprising a single thickness of said first secondary coil; and wherein said interleaving near said second bobbin end comprises:

a fourth, radially innermost layer, comprising a single thickness of said second secondary coil;

a fifth layer, radially outward from said fourth layer, comprising a double thickness of said first secondary coil; and a sixth layer, radially outward from said fifth layer, comprising a single thickness of said second secondary coil.

11. THE LVDT of claim 10, wherein said first and fourth layers form a first pair of layers substantially equidistant from said primary coil, said second and fifth layers form a second pair of layers substantially equidistant from said primary coil, and said third and sixth layers form a third pair of layers substantially equidistant from said primary coil.

12. The LVDT of claim 11, further comprising a first insulation covering between said first and second pair of layers, and a second insulation covering between said second and third pair of layers.

13. The LVDT of claim 12, wherein each of said insulation coverings includes a strip of insulating tape.

* * * * *

UNITED STATES PATENT AND TRADEMARK OFFICE
CERTIFICATE OF CORRECTION

PATENT NO. : 4,808,958
DATED : February 28, 1989
INVENTOR(S) : Dick Hewitt, Timothy Shoemaker, Paul Kitlas It is certified that error appears in the above-identified patent and that said Letters Patent is hereby corrected as shown below:

Abstract, Line 8, "seconardy" should read -- secondary --

Column 7, Line 42, "by" should read -- but --

Column 7, Line 64, "raids" should read -- rails --

Column 10, Line 21, "first and secondary" should read

-- first and second secondary --

Column 10, Line 29, "said secondary" should read

-- said second secondary --

Column 10, Line 30, "said secondary" should read

-- said second secondary --

Column 10, Line 39, "said secondary" should read

-- said second secondary --

Column 10, between lines 39 and 40, there is an entire line missing, which should read -- secondary coil between said cross-over point and said first --

UNITED STATES PATENT AND TRADEMARK OFFICE
CERTIFICATE OF CORRECTION

PATENT NO. : 4,808,958

DATED : February 28, 1989

INVENTOR(S) : Dick Hewitt, Timothy Shoemaker, Paul Kitlas

It is certified that error appears in the above-identified patent and that said Letters Patent is hereby corrected as shown below:

Column 10, Line 65, "en" should read -- end --

Column 11, Line 16, "the" should read -- said --

Signed and Sealed this

Seventh Day of November, 1989

*Attest:*

JEFFREY M. SAMUELS

*Attesting Officer*   *Acting Commissioner of Patents and Trademarks*